May 7, 1940.  G. A. TINNERMAN  2,200,047
FASTENING DEVICE
Filed May 6, 1939

INVENTOR.
GEORGE A. TINNERMAN
BY Bates, Goldrick, & Teare
ATTORNEYS

Patented May 7, 1940

2,200,047

UNITED STATES PATENT OFFICE 2,200,047

FASTENING DEVICE

George A. Tinnerman, Rocky River, Ohio, assignor, by mesne assignments, to Tinnerman Products, Inc., Cleveland, Ohio, a corporation of Ohio Application May 6, 1939, Serial No. 272,181

6 Claims. (Cl. 24—259)

This invention relates to fasteners for holding wires, conduits, tubes and the like in the desired position on supports and the present application comprises a continuation in part of my copending application, Serial No. 119,415 filed January 7, 1937.

An object of the present invention is the production of a simple and inexpensive fastener which can be readily and conveniently applied to an apertured support and which will remain in position thereon irrespective of jars or shocks that may be imparted to the support, thereby militating against unwarranted or accidental disengagement.

A further object of the present invention is to provide a fastening device which may be used in automotive assemblies for holding conduits, wires, or tubes in place, under conditions where it is desirable to maintain the body of the vehicle sealed against the entrance of water or other foreign material, and hence, the present invention also includes a fastener construction which will automatically seal the opening through which the fastener is adapted to be inserted during the assembly operation.

Figure 1:
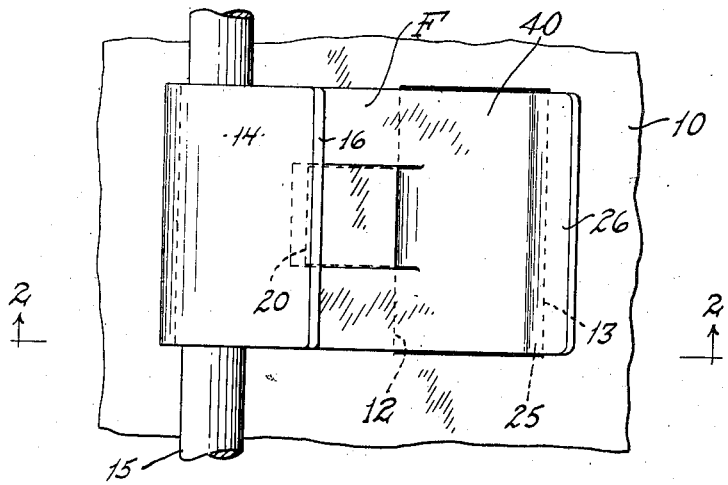
Figure 2:
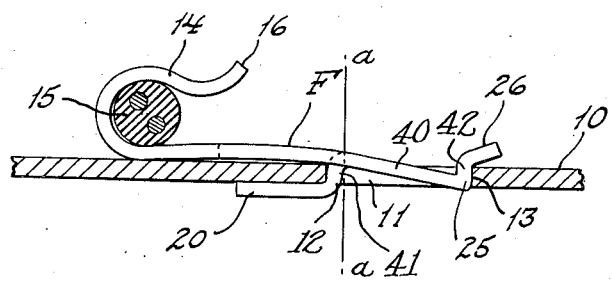

Referring now to the drawing, Fig. 1 is a top plan view of part of an assembly having a fastener made in accordance with the present invention attached thereto, and Fig. 2 is a section taken on a plane indicated by the line 2—2 in Fig. 1.

The fastener is shown in connection with a panel, or support, 10 having an opening 11 extending therethrough preferably in the form of a rectangle having opposing walls 12 and 13. The fastener which I have illustrated has a body F which is provided with an extension having means 40, 41 and 42 extending into the opening and coacting with the walls 12 and 13 thereof for retaining it in position upon the panel. The line a—a indicates the line of demarcation between the body and the extension. The fastener is preferably made from a sheet metal strip having spring like characteristics and having one end thereof reversely bent preferably upwardly and backwardly as at 14, to provide a loop for receiving a cable, or the like, indicated at 15. The end 16 is preferably bent outwardly to facilitate entrance of the cable into the fastener.

To retain the fastener in self-supporting position upon a panel, I have shown a portion 20 which is struck from the body and which extends out of the plane thereof in the form of a tongue. The tongue is spaced from the body a distance sufficiently to admit the panel 10 between the tongue and the body F and to make a snug fit therewith. Additionally the body extension has another portion deformed therefrom and extending downwardly in the form of a prong 25 which provides a shoulder for engaging the wall 13 as shown in Fig. 2. The prong co-operates with the tongue 20 to hold the fastener against one face of the panel in article receiving position thereon.

To apply the fastener to the panel, the free end of the tongue 20 may be inserted into the opening 11, whereupon the fastener is forced along the surface of the panel until the prong 25 snaps into the hole 11 as shown in Fig. 2. This holds the fastener securely against accidental removal because when in such position, retrograde movement of the fastener is prevented by the abutment 42 of the prong against the wall 13. To remove the fastener, it is only necessary to insert a sharp tool beneath the tab 26 and to pry the prong 25 out of the opening 11 and inasmuch as the tongue 20 is resilient, the fastener can be withdrawn by moving it in a longitudinal direction toward the wall 13.

A fastener made in accordance with my invention operates in a satisfactory manner to retain a cable, tube or the like upon a support and at the same time automatically closes the opening 11 at the completion of the inserting operation. This prevents the entrance of water or foreign material through the opening after the fastener has been positioned thereon.

I claim:

1. A fastening device for securing a cable, or the like, to a panel having a hole, comprising a clip having a substantially flat body, means attached to the body for holding a cable, or the like, a resilient tongue attached to the body and extending laterally of and then parallel with the same in superimposed relation with one face thereof and a prong projecting laterally of said body in the same direction as said tongue and spaced therefrom, whereby said body may lie flat against one face of the panel with the tongue extending through the hole and engaging the other face of the panel in opposition to said body and with said prong engaging the wall of the hole at a point opposite the place where the tongue extends through the hole to prevent unintentional withdrawal of the tongue from the hole.

2. A fastening device for securing a cable, or the like, to a panel having a hole comprising a clip having a substantially flat body, means attached to one edge of the body to project laterally therefrom for holding a cable, or the like, a resilient tongue attached to the central portion of the body and extending laterally of and then parallel with the same in superimposed relation with one face thereof and a prong projecting from the same side of the body as said tongue but in a direction away from the tongue and spaced therefrom, whereby said body may lie flat against one face of the panel in opposition to said body and with said prong engaging the wall of the hole at a point opposite the place where the tongue extends through the hole to prevent unintentional withdrawal of the tongue from the hole.

3. A fastening device for securing a cable, or the like, to a panel having a hole, comprising a clip having a substantially flat body, a bowed cable receiving and holding portion projecting from one edge of the body, a resilient tongue integral with the body to extend laterally from substantially the central portion of the same and then parallel thereto in superimposed relation with one face thereof, and a prong integral with the body to extend laterally on the same side as said tongue and spaced therefrom whereby said body may lie flat against one face of the panel with the tongue extending through the hole and engaging the other face of the panel in opposition to said body and with said prong engaging the wall of the hole at a point opposite the place where the tongue extends through the hole to prevent unintentional withdrawal of the tongue from the hole.

4. A fastening device for securing a cable or the like to a support provided with an assembling opening, a fastening device comprising a body having a tongue element struck out of the plane thereof, said tongue element and body cooperating to engage opposite faces of the support through the assembling opening, and said body having an extension substantially sealing said opening and extending in the same general direction as the body and being disposed in close relation to said support in the applied fastening position of the device, said body having a reverse bend therein for retaining an object relative to the support.

5. A fastening device for securing a cable or the like to a support provided with an assembling opening, a fastening device comprising a body including a tongue struck out of the plane thereof to extend in spaced relation thereto, said tongue and body cooperating to engage opposite faces of the support through said assembling opening, said body having an extension substantially sealing said opening and extending in the same general direction as the body and being disposed in close relation to the support in the applied fastening position of the device, said extension including means engaging a side wall of said opening to lock the device in such applied fastening position, and said body having a loop therein for retaining an object relative to the support.

6. A fastening device for securing a cable or the like to a support provided with an assembling opening which has opposing walls, a fastening device comprising a body including a tongue struck out of the plane thereof and extending in spaced relation to said body and cooperating to engage opposite faces of the support through said assembling opening, said tongue engaging one of the walls of the opening and said body having an extension substantially sealing said opening and having a shoulder formed integrally therewith and engaging the wall of the opening opposite that engaged by the tongue whereby the fastening device may be held in applied position upon the support, and said body having a reversely bent portion at the end opposite the extension for receiving a cable, tube, or the like.

GEORGE A. TINNERMAN.